Patented Mar. 13, 1951

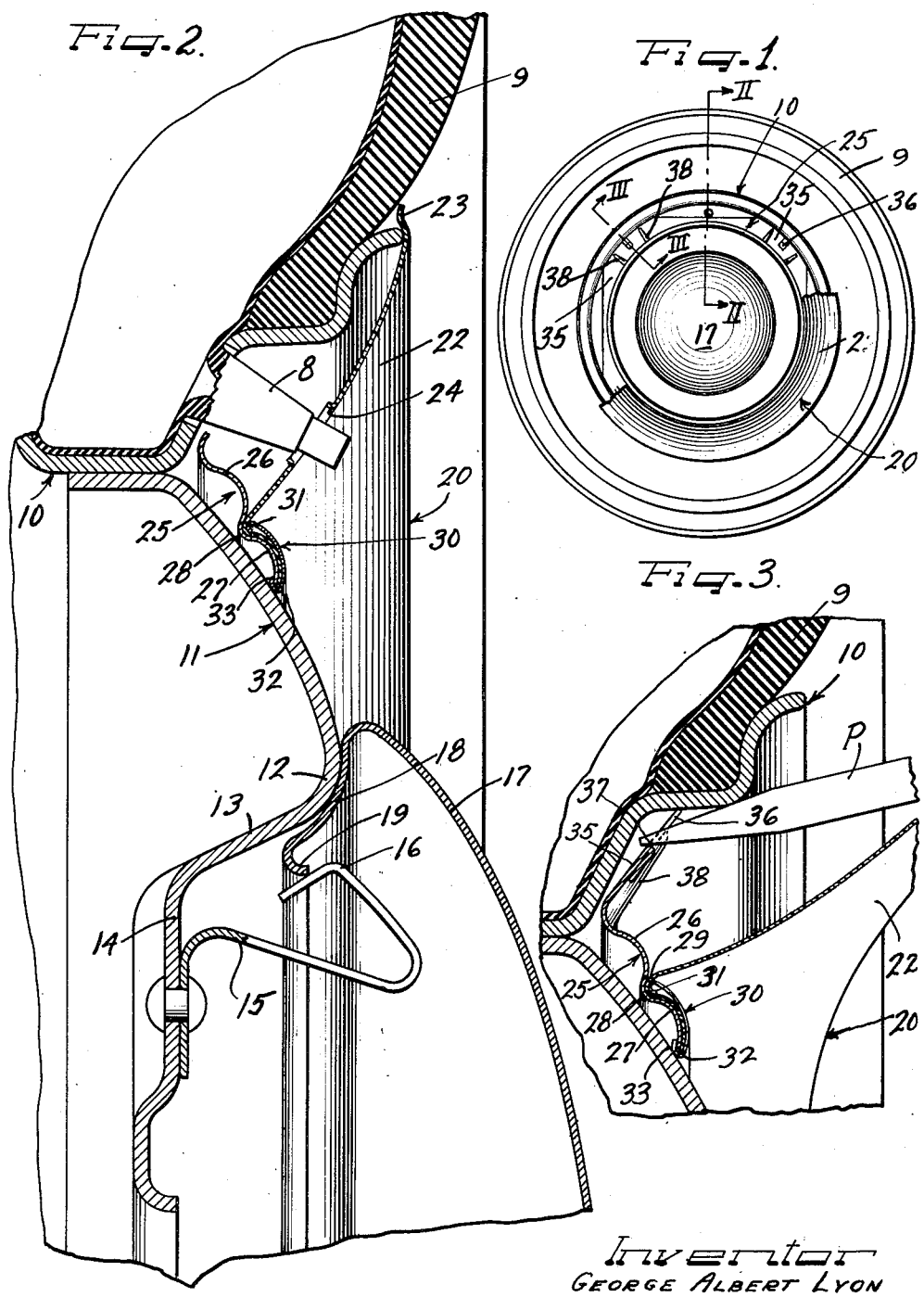

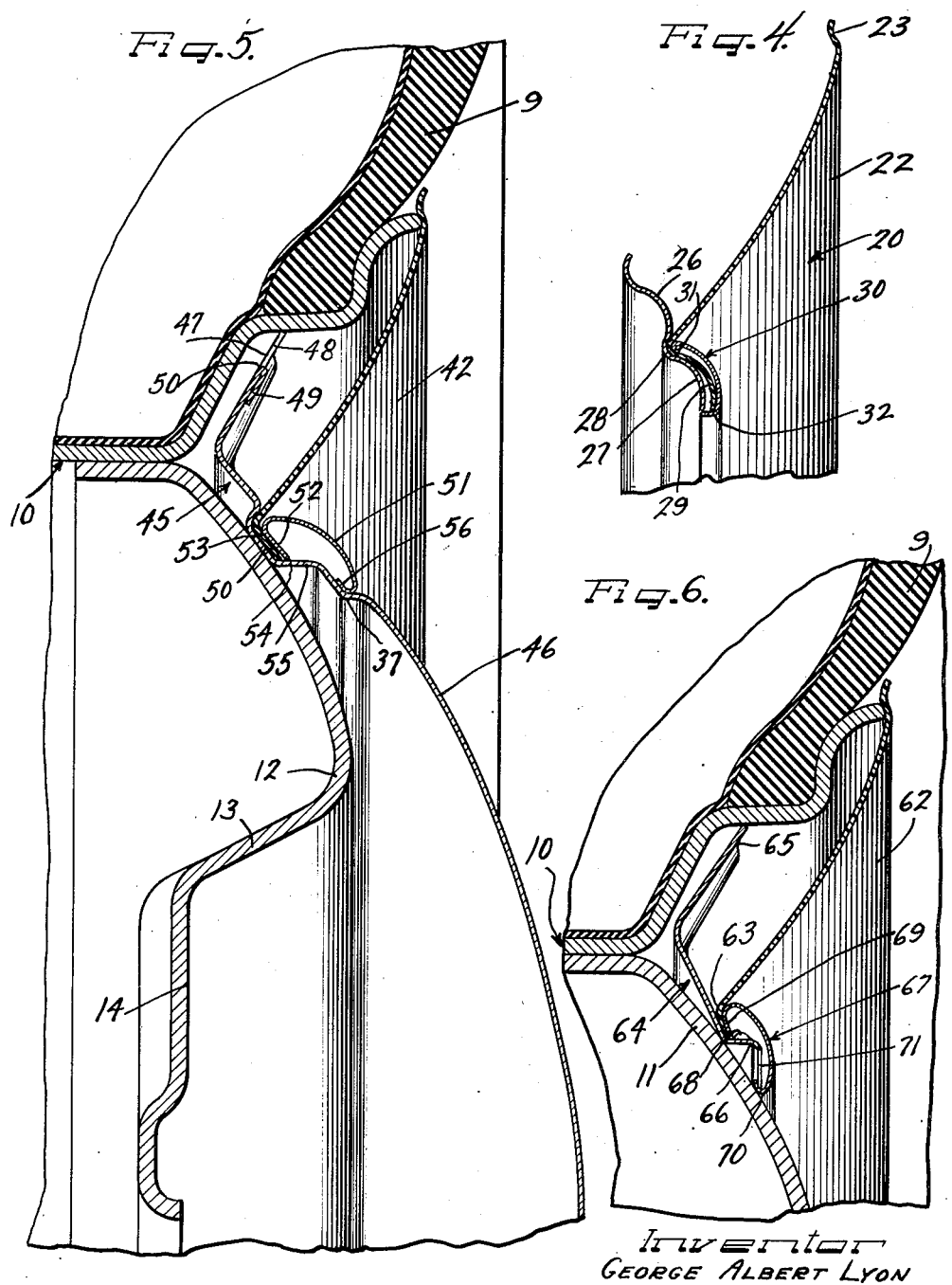

2,544,699

UNITED STATES PATENT OFFICE 2,544,699

WHEEL COVER

George Albert Lyon, Allenhurst, N. J.

Application July 7, 1945, Serial No. 603,661

14 Claims. (Cl. 301—37)

1

This invention relates to a wheel cover structure and more particularly to novel retaining means for a snap-on ornamental wheel trim.

An object of this invention is to provide a snap-on wheel trim or cover with inclined retaining means such as fingers, and so formed that they may be disengaged from an axially outer side of the wheel, upon pressure thereon and from retaining cooperation with the wheel.

Still another object of this invention is to provide retaining fingers for a wheel cover or trim which, although inclined radially and axially outwardly for tight gripping engagement with a part of the wheel, may be engaged by a pry-off tool inserted behind the cover, from an axially outer side of the wheel, to disengage the cover from the wheel by flexure of one or more of the fingers.

Yet another object of this invention is to provide a wheel cover or trim with retaining means, which is simple in construction and which may be very effectively engaged with the wheel and yet easily disengaged when it is desired to remove the cover from the wheel.

In accordance with the general features of this invention there is provided in a cover structure for a wheel including a multi-flange tire rim part and a wheel body part, a circular wheel cover of resiliently deflectable form-sustaining plastic material disposed over exposed flanges of the rim part and concealed resilient cover retaining means cooperable with one of the wheel parts and having an edge engageable by a pry off tool from an axially outer side of the wheel upon flexure of the cover portion, whereby said edge upon pressure thereon will yield to resiliently bend the cover retaining means and disengage the cover from retaining cooperation with the wheel.

Another feature of the invention relates to the provision, in a structure of the aforesaid characteristics, of various forms of attaching means for securing the cover in place and, which may be in the form of a ring or an outer annular portion of a central cover.

Yet another feature of the invention relates to the forming of the retaining means out of radially outer corners of a metallic ring, and also to forming a radially inner portion of the ring so as to be nestingly engaged by a radially inner margin of the cover portion and whereby the cover portion and the ring may be easily clamped together by means of an ornamental bead or the like.

It is also clear, in accordance with the features of this invention, that I have provided a

2 new article of manufacture, which comprises a self-retainable wheel cover or trim, and which has concealed retaining fingers for snap-on engagement with the wheel part; at least one of the fingers having an edge portion accessible for manual pressure thereon from an axially outer side of the cover to bend the finger and disengage the cover from the wheel.

The aforesaid structure is definitely advantageous over previous structures where the retaining fingers had such a biting or wedged engagement with a wheel part, such as the flange of a tire rim, that it was not feasible to disengage the cover from the wheel without damaging or permanently distorting the retaining fingers.

Other features and objects of this invention will more fully appear from the following detailed description taken in connection with the accompanying drawings which illustrate several embodiments thereof, and in which:

Figure 1 is a side view of wheel structure having a cover or trim embodying the features of this invention, and wherein the outer cover portion is partly broken away to show the retaining means therebehind;

Figure 2 is an enlarged fragmentary cross-sectional view taken on substantially the line II—II of Figure 1, looking in the direction indicated by the arrows;

Figure 3 is an enlarged fragmentary cross-sectional view taken on substantially the line III—III of Figure 1, but showing the flexible plastic annular plastic cover portion deflected axially outwardly and illustrating how a pry-off tool is engageable with a shoulder or edge on one of the retaining fingers for flexing the finger out of its wedging or biting engagement with the tire rim;

Figure 4 is an enlarged fragmentary cross-sectional view of a portion of the cover corresponding to the section shown in Figure 2 and showing the position of outer retaining bead prior to it being clinched to the retaining ring to lock seam the outer plastic cover portion to the metal retaining ring;

Figure 5 is an enlarged fragmentary cross-sectional view similar to Figure 2, but illustrating a modification of the invention wherein the retaining member is part of a cover disc and wherein a snap-on bead is employed for attaching the flexible annular cover portion to the metal disc; and Figure 6 is an enlarged fragmentary cross-sectional view similar to Figure 5, but showing the retaining member in the form of a ring instead of in a form of a disc and with a slightly different form of retention for the outer annular bead.

As shown on the drawing:

The reference character 9 designates generally a conventional pneumatic tire and tube supported in the usual way upon a multi-flange drop center type of tire rim 10. This tire rim is carried and attached to a central body part 11 which comprises a dished metallic stamping and includes a central nose portion 12, an inclined depressed portion 13 and a bolt-on flange 14. The flange 14 is adapted to be screwed, in the usual way, to a part on the axle of a vehicle by bolts or cap screws (not shown).

In addition, the bolt-on flange 14 has secured to it the usual hub cap retaining spring clips 15 which may be of any suitable number, such for example, as three to five, and each of which is of the so-called "inverted" type. These spring clips 15 each include a free cam-like extremity 16 for holding the central metal hub cap 17 on the nose 12 of the wheel body part 11. The hub cap, as is customary, includes an underturned skirt 18 having a turned edge 19 adapted to be snapped over the cam like extremities 16, as shown in Figure 2, for retention on the wheel. The spring clips 15 permit of the so called "easy-on hard-off" action of the hub cap.

My invention, however, is principally concerned with the provision of an ornamental wheel cover for the wheel, and especially for the exposed side outer side flanges of the tire rim part 10. Such a cover is designated generally by the reference character 20, as shown in Figures 1 to 4, inclusive. It includes an annular cover portion 22 which may be made of any suitable resiliently deflectable but form-sustaining material. I preferably make this annular portion of synthetic plastic material, such for example ethyl cellulose, cellulose acetate or vinyl resins.

The cover portion 22 includes a slightly turned outer edge 23 for overhanging the outer edge of the rim part 10 in close proximity to an outer side wall of the tire 9. The portion 22 extends radially and axially inwardly from the edge 23 to a point over the body part 11 and is of such inclination and curvature, that in use, it appears to constitute a continuation of the side wall of the tire. This appearance may be augmented if the external surface of portion 22 is finished in white, in which event it appears to constitute a white side wall portion of the tire, thereby giving the appearance of the tire extending clear down to the body part of the wheel. It should be noted at this time that this feature is common to all forms of my invention and hence a description of the same will not be repeated in the case of each form.

The portion 22 has a flanged aperture 24 through which an outer extremity of the valve stem 8 may project in order to facilitate access to the valve stem. It is, of course, clear, however, that if a shorter valve stem is employed, the opening 24 may be dispensed with in which event access may be had to the valve stem by the manual flexing of the portion 22 to the position such as that shown in Figure 3. These features are likewise common to all forms of my invention.

More particularly my invention is concerned with the provision of novel retention means for detachably holding this plastic cover portion on the wheel. In the first form of the invention, shown in Figures 1 to 4, inclusive, such a retaining means is designated generally by the reference character 25 and comprises a metallic ring having two axially outwardly channeled portions 26 and 27. The junction of these two channels comprises an annular rib or shoulder 28 in which a radial inner margin 29 of the cover portion 22 is adapted to be seated. This inner curved edge or margin 29 is of such a curvature that it can tightly nest around the channeled portion 27 of the ring.

In order to hold this margin 29 in nested relation with the ring, I provide a separate ornamental retaining ring 30 disposed on the axially outer side of the cover. This ring has an outer turned edge 31 seated on the cover opposite the rib or groove 28 of the retaining ring 25, and also is provided with an inner turned edge 32 lock-seamed at 33 to the inner margin of the channeled portion 27 of ring 25. In Figure 4, I have illustrated the condition of the edge 32 prior to its being bent or spun radially outwardly behind the channeled portion 27 of ring 25. Thus, there is provided a very simple but effective way of attaching the retaining metallic ring 25 to the plastic cover portion 22.

I also desire to call your attention to the fact that the ring 25 may comprise metallic stamping although I contemplate making it from a section of rolled spiral strip stock, the ends of which section may be suitably welded together to make a continuous ring. The channeled portion 26 has extending radially from it four equidistantly spaced corners, each of which comprises a resilient retaining finger 35. This finger, as best shown in Figure 3, extends radially and axially outwardly and is adapted, when pressed home against the tire rim flange, to wedgingly grip the same for the purpose of holding the cover itself on the wheel.

I also, in accordance with the features of this invention, have provided a notch or aperture 36 in the edge of at least one of these fingers although all of them may have this feature. This notch results in the provision of a shoulder or edge 37 adapted to be engaged by the end of a pry-off tool, such as a screw driver, as shown in Figure 3.

Each of these fingers or corners 35 may be ribbed at 38 to reinforce the finger. Also the shoulder 37 may be provided by turning back upon the finger the piece cut from the finger to form the notch 36.

In the application of my cover assembly to the wheel, the cover is first placed over the wheel with the aperture 24 of cover portion 22 opposite the valve stem 8. Then, the cover is pressed axially home, thus resulting in the extremities of the corners or fingers 35 sliding along the inclined flange of the tire rim into a wedged or biting engagement therewith. It will be appreciated that by reason of the inclination of these fingers any tendency to pull the cover off the wheel will be resisted by an enhanced gripping engagement. For this reason, unless the pry-off feature of my invention is employed, anyone endeavoring to remove the retaining ring 25 will be apt to permanently buckle or damage the retaining fingers.

I have devised a very simple way of disengaging the fingers through the provision of apertures 36 which result in the shoulders or edges 37 adapted to be engaged by the screw driver P. To remove the cover all that is necessary is to manually flex or bend a part of the annular plastic cover portion 22 away from the wheel, as shown in Figure 3, and to then insert the screw driver in one of the finger notches 36. Thereafter, upon exertion of upward pressure on the screw driver, the extremity of the finger can be resiliently bent out of biting engagement with the rim flange. The cover can then be progressively disengaged from the wheel without permanently damaging the retaining fingers so that they can be reused when it is desired to again mount the cover assembly on the wheel.

In the other forms of the invention, illustrated in Figures 5 and 6, I employ the same wheel and for that reason the same reference numerals are used to designate parts of the wheel common to these forms and the one shown in Figure 2.

In Figure 5, the plastic annular cover 42 is similar to the cover portion 22, but is held against the retaining member 45 in a slightly different manner. In this form the retaining member 45 comprises the outer annular margin of a disc, the central portion of which is formed into a hub cap simulating crown part 46.

The retaining member 45 has four corners or fingers 47 similar in structure and function to that of fingers 35. As in the case of the first form, each finger is notched at 48 and the cut out portion is turned back down on the main body of the finger, as at 49, to provide a pry off shoulder 50.

An intermediate portion of the retaining member 45 is provided with an annular groove or depression 50 in which the inner margin of the plastic cover portion 42 is seated and is retained by an outer metallic bead 51. The bead 51 has an outer turned edge 52 which tightly fits in the grooved portion 50 over the turned inner edge 53 of the plastic. The extremity of this edge 52 has a biting engagement at 54 with a shoulder 55 formed between the outer retaining portion of member 45 and the crown portion 46.

The ornamental bead 51 also has a radial inner turned marginal edge 56, which is adapted to seat on another shoulder 57 formed at the outer margin of the crown portion 46.

In the assembling of this form of the cover the portion 42 is positioned over the retaining member 45 with its inner turned margin 53 seated in the groove 50. Thereafter the ornamental stainless annular bead 51 is pressed home into retaining engagement with the member 45 and directly over the turned portion 53 of the plastic cover in the groove 50.

The application of this cover to the wheel is substantially the same as in the preferred form and the same is also true as to its assembly. It will be noted that, as in the preferred form, the cover when it is pressed home, is in solid engagement with the body part 11 of the wheel so that it is backed up by the body part. The outer margin of the plastic cover portion 42 engages the edge of the rim and by reason of the resiliency of the plastic can yield slightly in accommodating allowable manufacturing variations in the rim and body parts of the wheel.

The form of the invention shown in Figure 6 is substantially similar to that shown in Figure 5, with the principal exception that the retaining member is in the form of a ring and does not embrace a central crown portion. Also a slightly different form of means for holding the plastic and metal parts of the cover together is employed.

The plastic cover portion 62 has an inner turned margin 63 seated on an intermediate portion on the retaining ring 64 which includes fingers or corners 65, which are substantially similar to the fingers of the previous forms. It should be noted that in all forms, while I contemplate employing four equidistantly spaced fingers, the invention is not to be thus limited inasmuch as the number of fingers can be varied if it is so desired.

The inner margin of the retaining ring is adapted to bear against the body part when the cover is on the wheel and is provided with an axial flange or shoulder 66 cooperable with an annular stainless bead 67. The shoulder 66 has a plurality of radial extending protuberances or teats 68, over which the inner turned edge 69 of the retaining bead 67 is adapted to be snapped to hold the plastic portion 62 tightly against the retaining ring 64. The inner margin of the ring 67 is also turned upon itself at 70 so as to envelop and conceal the edge 71 of the retaining ring 64.

This form is applied and removed from the wheel in substantially the same way as in the other forms and hence has substantially the same advantages.

Cross reference is made to my copending application Serial No. 636,873, filed December 22, 1945, which is a continuation-in-part of the present application and broadly covers the attachment of the trim ring with the retaining and attaching member of the composite cover, having especial regard to the forms of the invention shown in Figures 2 and 5 of the present application.

I claim as my invention:

1. In a cover structure for a wheel including a multi-flange tire rim part and a wheel body part, a circular wheel cover including a radial outer annular portion of form-sustaining but resiliently deflectable plastic material disposed over exposed flanges of said rim part and concealed resilient cover retaining means cooperable with one of said wheel parts and having an edge engageable by a pry-off tool upon manual flexure of said annular cover portion axially from the wheel, said edge of said resilient retaining means, upon pressure thereon by the pry-off tool, yielding to disengage said retaining means from cover retaining cooperation with the wheel, said retaining means comprising a ring of a generally polygonal outline at its radially outer margin and having four equidistantly spaced corners, each of which is formed into a retaining finger, said ring being formed radially inward of said fingers for securement to said annular cover portion and having its central portion formed into a crown shape simulating a hub cap.

2. In a cover structure for a wheel including a multi-flange tire rim part and a wheel body part, a circular wheel cover including a radial outer annular portion of form-sustaining but resiliently deflectable plastic material disposed over exposed flanges of said rim part and concealed resilient cover retaining means cooperable with one of said wheel parts and having an edge engageable by a pry-off tool upon manual flexure of said annular cover portion axially away from the wheel, said edge of said resilient retaining means, upon pressure thereon by the pry-off tool, yielding to disengage said retaining means from cover retaining cooperation with the wheel, said retaining means comprising a ring having its outer marginal portion formed into retaining fingers at least one of which includes the aforesaid edge, the radial inner margin of said ring being in lapping relationship with said annular cover portion for defining a seat for the radial inner margin of the cover portion and to which the cover portion is secured, said seat and inner margin of the cover portion being retained in nested relationship by an ornamental annular bead positioned on the axially outer side of the cover portion at the junction of the ring and annular cover portion.

3. As an article of manufacture, a self-retainable wheel cover having retaining fingers for snap-on engagement with the wheel, at least one of which is provided with a pry-off notch in its retaining edge portion, said notch being of substantially less depth than the length of the finger and being accessible for manual pressure thereon from an axially outer side of the cover to deflect the finger and thus disengage the cover from the wheel.

4. In a cover structure for a wheel including a generally axially extending annular surface portion, a cover member having a resiliently flexible portion thereof formed with an edge for bitingly engaging said surface, and a pry-off edge on said cover member offset only a short distance from and facing in the same direction as said biting edge and of a width to be engageable by a pry-off tool, said pry-off edge being located in a plane between said biting edge and the general flexing axis of said portions so that when pry-off force is applied to the pry-off edge the biting edge is resiliently bent away from said surface for releasing the cover member from the wheel.

5. In a cover structure for a wheel including a generally axially extending annular surface portion, a cover member having a portion thereof formed with an edge for bitingly engaging said surface, and a pry-off edge on said cover member offset only a short distance from the biting edge thereof and engageable by a pry-off tool, the relationship of said pry-off edge to said biting edge being such that when pry-off force is applied to the pry-off edge the biting edge is resiliently bent away from said surface for releasing the cover member from the wheel, said pry-off edge having reinforcement therealong and preventing damage from the pry-off tool.

6. In a cover structure for a wheel including a generally axially extending annular surface portion, a cover member having a resiliently flexible portion thereof formed with an edge for bitingly engaging said surface, and a pry-off edge on said cover member offset only a short distance from and facing in the same direction as said biting edge and of a width to be engageable by a pry-off tool, said pry-off edge being located in a plane between said biting edge and the general transverse flexure axis of said portion so that when pry-off force is applied to the pry-off edge the biting edge is resiliently bent away from said surface for releasing the cover member from the wheel, said cover member having a reinforcing bead extending radially adjacent to the biting edge.

7. In a cover member of the character described adapted for self-retaining engagement with a generally axially extending surface on a wheel and for this purpose including a resiliently flexible finger for engaging in edgewise biting relation with such surface, said finger having a clearance in the biting edge thereof providing an offset pry-off edge facing in the same direction as said biting edge and disposed between said biting edge and the general transverse flexure axis of the finger to be engageable by pry-off tool for bending the biting edge out of engagement with the surface of the wheel.

8. In a cover structure for a wheel including a multi-flange tire rim part and a wheel body part, a cover member having a generally radially outwardly extending biting finger for engagement with a flange of the tire rim part, said finger having a notch therein of substantially less depth than the length of the finger and within which a pry-off tool is engageable for bending the finger out of engagement with the tire rim.

9. In a cover structure for a wheel including a tire rim part having a generally radially extending annular intermediate flange, a trim ring for substantially concealing the outer side of the tire rim, and a circular member carrying said trim ring and having a biting finger for retainingly engaging said intermediate flange of the tire rim, said finger having a pry-off notch in the tire rim biting edge thereof and of substantially less depth than the length of the finger and affording pry-off tool clearance in the biting edge thereof, and said trim ring being formed from flexible material whereby it is adapted to be flexed open for access to said notch by a pry-off tool.

10. In a wheel cover of the character described, a trim ring portion having a generally radially inwardly and axially outwardly extending inner marginal divergent flange on a rib-like juncture facing generally axially inwardly, a ring member retainingly supporting the trim ring and having on the inner margin thereof a pair of annular outwardly protruding ribs defining an outwardly opening groove therebetween receptive of said juncture rib on the trim ring, and means for retaining said flange in assembly with the retaining member with said rib-like juncture seated in said groove.

11. In a wheel cover of the character described, a trim ring portion having a generally radially inwardly extending inner marginal flange having a rib-like juncture facing generally axially inwardly, a member retainingly supporting the trim ring and having a groove therein receptive of said juncture rib on the trim ring, and means for retaining said flange in assembly with the retaining member with said juncture rib seated in said groove, said means comprising an ornamental and retaining bead having an edge portion engaging within the juncture of said flange with the body of the trim ring and acting to clamp the flange against said retaining member.

12. In a wheel structure including a wheel body and a multi-flange tire rim having a generally radially inwardly facing intermediate generally axially extending flange portion, a cover including a trim ring portion formed from resiliently flexible material and having an inner marginal generally radially inwardly and axially outwardly extending flange, a retaining member having a groove within which said flange is seated, an annulus secured to said retaining member and clamping said flange in said groove and having a rounded edge engaging at the juncture of said flange with the body of the trim ring whereby the trim ring is manually flexible generally axially outwardly to bend about said juncture backed up by said edge, the radially outer portion of said retaining member having generally radially outwardly and axially outwardly extending spaced retaining fingers bitingly engaging with said flange portion of the tire rim for retaining the cover assembly on the wheel, at least one of said fingers having a notch in the biting edge thereof engageable by a pry-off tool inserted behind said trim ring after the latter has been flexed open, said notched retaining finger being bendable generally axially outwardly and radially inwardly at its biting edge away from said tire rim flange upon the application of pry-off tool force to the edge of said notch.

13. In a cover structure for disposition at the outer side of a vehicle wheel having a tire rim with a generally axially extending annular intermediate flange, a cover member for disposition in substantial concealing relation to the outer side of the wheel and having a generally axially and radially outwardly extending retaining finger for wedging, biting endwise engagement against the inner surface of the tire rim, said retaining finger having a notch in the retaining edge thereof located at an intermediate point of said edge and being of substantially less depth than the length of the finger, and a reinforcing rib extending longitudinally of the finger between said notch and the adjacent side edge of the finger and improving the rigidity of the finger.

14. In a cover structure for disposition at the outer side of a vehicle wheel including a tire rim having a generally axially extending annular intermediate flange, a cover member having a generally radially and axially outwardly extending marginal retaining finger engageable in wedging, biting engagement with said tire rim flange to retain the cover on the wheel, and a reinforcing rib extending longitudinally of said finger radially inwardly from adjacent to the biting edge to increase the rigidity of the finger.

GEORGE ALBERT LYON.

REFERENCES CITED

The following references are of record in the file of this patent:

UNITED STATES PATENTS

| Number | Name | Date |
| --- | --- | --- |
| 1,234,387 | Pugh et al. | July 24, 1917 |
| 1,948,273 | Lyon | Feb. 20, 1934 |
| 2,309,519 | Lyon | Jan. 26, 1943 |
| 2,368,230 | Lyon | Jan. 30, 1945 |
| 2,368,246 | Lyon | Jan. 30, 1945 |
| 2,386,233 | Lyon | Oct. 9, 1945 |